(12) United States Patent
Ben-Yaakov et al.

(10) Patent No.: US 11,370,308 B1
(45) Date of Patent: Jun. 28, 2022

(54) PARALLEL POWER DISTRIBUTION AND CHARGING SYSTEM

(71) Applicant: IRP Nexus Group, Ltd., Ness Ziona (IL)

(72) Inventors: Shmuel Ben-Yaakov, Tel Itzhak (IL); Paul Price, Ness Ziona (IL); Amit Grauer, Rehovot (IL)

(73) Assignee: IRP Nexus Group, Ltd., Ness Ziona (IL)

( * ) Notice: Subject to any disclaimer, the term of this patent is extended or adjusted under 35 U.S.C. 154(b) by 0 days.

(21) Appl. No.: 17/467,111

(22) Filed: Sep. 3, 2021

(51) Int. Cl.
| | | |
|---|---|---|
| *B60L 50/60* | (2019.01) | |
| *B60L 53/51* | (2019.01) | |
| *B60L 50/70* | (2019.01) | |

(52) U.S. Cl.
CPC ............ *B60L 50/60* (2019.02); *B60L 50/70* (2019.02); *B60L 53/51* (2019.02); *B60L 2210/10* (2013.01)

(58) Field of Classification Search
CPC .......... B60L 50/60; B60L 50/70; B60L 53/51; B60L 2210/10
USPC ....................................................... 307/142
See application file for complete search history.

(56) References Cited

U.S. PATENT DOCUMENTS

| | | | |
|---|---|---|---|
| 4,463,400 A | * | 7/1984 | Paice .................. H01H 33/596 361/5 |
| 8,896,251 B2 | | 11/2014 | Le et al. |
| 10,673,244 B2 | | 6/2020 | Arditi et al. |
| 2009/0284240 A1 | | 11/2009 | Zhang et al. |
| 2010/0126550 A1 | | 5/2010 | Foss |
| 2017/0005371 A1 | | 1/2017 | Chidester et al. |

OTHER PUBLICATIONS

Lee and Kim, "Design Considerations for Parallel Differential Power Processing Converters in a Photovoltaic-Powered Wearable Application," *Energies* 2018, 11, 3329; doi:10.3390/en11123329, 17 pages.

* cited by examiner

*Primary Examiner* — Hal Kaplan
(74) *Attorney, Agent, or Firm* — Fish & Richardson P.C.

(57) ABSTRACT

The present disclosure involves an electrical power management module configured to provide electrical power from a power unit to a parallel power bus, comprising: a switch circuit coupleable to the power unit and to the parallel power bus for delivering power from the power unit to the parallel power bus and for charging the power unit from the parallel power bus, the switch circuit changeable between connecting and disconnecting the power unit with the parallel power bus; and a bypass circuit around the switch circuit, coupleable to the power unit and to the parallel power bus for delivering power from the power unit to the parallel power bus and for charging the power unit from the parallel power bus, the bypass circuit comprising a bidirectional power converter.

21 Claims, 13 Drawing Sheets

| Mode | Power Unit Operations | Power Unit 102a | | | Power Unit 102b | | | Power Unit 102c | | |
|---|---|---|---|---|---|---|---|---|---|---|
| | | Voltage | Switch | Power Converter | Voltage | Switch | Power Converter | Voltage | Switch | Power Converter |
| 1 | All Disconnected | <Vbus | off | off | <Vbus | off | off | <Vbus | off | off |
| 2 | All Disconnected | >Vbus | off | off | >Vbus | off | off | >Vbus | off | off |
| 3 | One Discharging | =Vbus | on | off | <Vbus | off | off | <Vbus | off | off |
| 4 | Two Discharging | =Vbus | on | off | =Vbus | on | off | <Vbus | off | off |
| 5 | Three Discharging | <Vbus | off | Boost | <Vbus | off | Boost | <Vbus | off | Boost |
| 6 | One Charging, One Discharging | =Vbus | on | off | <Vbus | off | Buck | <Vbus | off | off |
| 7 | One Charging, Two Discharging | =Vbus | on | off | <Vbus | off | Boost | <Vbus | off | Buck |
| 8 | Two Charging, One Discharging | =Vbus | on | off | =Vbus | on | off | <Vbus | off | Buck |
| 9 | One Voltage Regulator | <Vbus | off | Boost | <Vbus | off | off | <Vbus | off | off |
| 10 | Three Charging | <Vbus | off | Buck | <Vbus | off | Buck | <Vbus | off | Buck |

PARALLEL POWER DISTRIBUTION AND CHARGING SYSTEM

TECHNICAL FIELD

This disclosure generally relates to connecting multiple power units to a parallel electric power bus.

BACKGROUND

An electrical power system can include multiple electrical power units connected to a parallel power bus for providing electrical energy from the power units to the bus and for receiving electrical energy from the power bus to the power units. Power units that are connected to the same parallel power bus should have approximately equal voltages. Paralleling power units with unequal voltages can be inefficient and potentially dangerous.

SUMMARY

In general, the disclosure involves parallel power distribution and charging/discharging systems. Specifically, the disclosed systems and techniques relate to parallel power bus operations including electrically coupling multiple electrical power units, which may have different voltage levels, in parallel to an electrical power bus. The power bus can be used to supply power to a load, to receive power from a source, or both.

When connected to the power bus, the electrical power units can provide electrical energy to the power bus, can be charged from the parallel power bus, or both. In some examples, some electrical power units can provide electrical energy to the power bus while other electrical power units are charged from the power bus. The disclosed techniques allow multiple electrical power units to be safely and efficiently coupled to the parallel power bus, even when they have different voltages.

Some aspects of the present disclosure provide unique advantages in that they permit paralleling multiple power units to a power bus when the power units have unequal voltages. Paralleling multiple power units to a power bus can be more practical than connecting one large power unit to the power bus. For example, using multiple power units can allow for a reduced size and weight of each power unit. Multiple, smaller power units can be easier to manufacture, ship, install, repair, and replace, when compared with fewer, larger power units.

The disclosed techniques can also permit charging a first subset of power units from the power bus while discharging a second subset of power units to the power bus. Simultaneous charging and discharging operations can improve efficiency and can be used to balance charge levels of the multiple power units. Thus, the disclosed techniques can be used to improve efficiency and safety of parallel operations of multiple power units connected to a parallel power bus.

One example implementation includes an electrical power management module configured to provide electrical power from a power unit to a parallel power bus. The electrical power management modules includes: a switch circuit coupleable to the power unit and to the parallel power bus for delivering power from the power unit to the parallel power bus and for charging the power unit from the parallel power bus, the switch circuit changeable between connecting and disconnecting the power unit with the parallel power bus; and a bypass circuit around the switch circuit, coupleable to the power unit and to the parallel power bus for delivering power from the power unit to the parallel power bus and for charging the power unit from the parallel power bus, the bypass circuit including a bidirectional power converter.

Implementations can optionally include one or more of the following features.

In some instances, the electrical power management module includes a controller configured to perform operations including: determining to connect the power unit to the parallel power bus; and in response to determining to connect the power unit to the parallel power bus, controlling at least one of operation of the switch circuit or operation of the bypass circuit to connect the power unit to the parallel power bus through one of the switch circuit or the bypass circuit.

In some instances, the operations include determining to connect the power unit to the parallel power bus to provide electrical power to the parallel power bus; determining a voltage difference between a voltage of the parallel power bus and a voltage of the power unit; and based on the voltage difference exceeding a specified threshold voltage difference, controlling operation of the bypass circuit to cause the power unit to provide electrical power to the parallel power bus through the bidirectional power converter.

In some instances, controlling operation of the bypass circuit to cause the power unit to provide electrical power to the parallel power bus through the bidirectional power converter includes: controlling operation of the bidirectional power converter to Boost current flow from the power unit to the parallel power bus.

In some instances, the operations include: determining to connect the power unit to the parallel power bus to charge the power unit from the parallel power bus; determining a voltage difference between a voltage of the parallel power bus and a voltage of the power unit; and based on the voltage difference exceeding a specified threshold voltage difference, controlling operation of the bypass circuit to cause the power unit to charge from the parallel power bus through the bidirectional power converter.

In some instances, controlling operation of the bypass circuit to cause the power unit to receive electrical power from the parallel power bus through the bidirectional power converter includes: controlling operation of the bidirectional power converter to control current flow from the parallel power bus to the power unit.

In some instances, the operations include: determining to connect the power unit to the parallel power bus to provide electrical power to the parallel power bus; determining a voltage difference between a voltage of the parallel power bus and a voltage of the power unit; and based on the voltage difference being less than a specified threshold voltage difference, controlling operation of the switch circuit to cause the power unit to provide electrical power to the parallel power bus through the switch circuit.

In some instances, the operations include: determining to connect the power unit to the parallel power bus to charge the power unit from the parallel power bus; determining a voltage difference between a voltage of the parallel power bus and a voltage of the power unit; and based on the voltage difference being less than a specified threshold voltage difference, controlling operation of the switch circuit to cause the power unit to charge from the parallel power bus through the switch circuit.

In some instances, the bidirectional power converter is configured to operate as a step up converter in a first direction from the power unit to the parallel power bus and to operate as a step down converter in a second direction from the parallel power bus to the power unit.

In some instances, the power unit is selected from the group consisting of: a lithium-ion battery, a lead battery, a fuel cell, or a solar cell.

In some instances, the switch circuit includes a switch selected from the group consisting of: a unidirectional switch, a bidirectional switch, and a MOSFET.

In some instances, the bidirectional power converter is selected from the group consisting of: a Buck-Boost converter, a dual-active bridge, and a resonant converter.

One example implementation includes a system, including a plurality of electrical power management modules arranged in parallel and each configured to connect and disconnect a respective power unit of a plurality of power units to a parallel power bus. Each electrical power management module includes: a switch circuit coupleable to the corresponding power unit and to the parallel power bus for delivering power from the corresponding power unit to the parallel power bus and for charging the corresponding power unit from the parallel power bus, the switch circuit changeable between connecting and disconnecting the corresponding power unit with the parallel power bus; and a bypass circuit around the switch circuit, coupleable to the corresponding power unit and the parallel power bus for delivering power from the corresponding power unit to the parallel power bus and for charging the corresponding power unit from the parallel power bus, the bypass circuit including a bidirectional power converter.

Implementations can optionally include one or more of the following features.

In some instances, the system includes a controller configured to perform operations including: selecting, from the plurality of power units, one or more power units to provide electrical power to the parallel power bus; and controlling, for each respective electrical power management module corresponding to the selected one or more power units, at least one of operation of the switch circuit or operation of the bypass circuit to connect the power unit to the parallel power bus through one of the switch circuit or the bypass circuit.

In some instances, the operations include: identifying a power unit of the plurality of power units that has a highest charge state; controlling the switch circuit of the electrical power management module corresponding to the identified power unit to connect the identified power unit to the parallel power bus through the switch circuit; and for each of the plurality of power units, excluding the identified power unit: controlling the bypass circuit of the corresponding electrical power management module to connect the power unit to the parallel power bus through the bypass circuit.

In some instances, the operations include: for each of the selected one or more power units: determining an electrical current to draw from the power unit to provide power to the parallel power bus; and controlling operations of the switch circuit or the bypass circuit to draw the determined electrical current from the power unit.

In some instances, the operations include determining the electrical current to draw from the power unit based at least in part on a charge state of the power unit.

In some instances, the system includes a controller configured to perform operations including: selecting, from the plurality of power units, one or more power units to charge from the parallel power bus; and controlling, for each respective electrical power management module corresponding to the selected one or more power units, at least one of the operation of the switch circuit or operation of the bypass circuit to connect the power unit to the parallel power bus through one of the switch circuit or the bypass circuit.

In some instances, the operations include selecting the one or more power units to receive electrical power from the parallel power bus based at least in part on a charge state of each of the plurality of power units.

In some instances, the parallel power bus is configured to provide electrical power to a drive motor of an electric vehicle.

One example implementation includes a computer-implemented method for controlling operations of a plurality of electrical power management modules that are each configured to connect and disconnect a respective power unit of a plurality of power units to a parallel power bus. Each electrical power management module includes: a switch circuit coupleable to the corresponding power unit and to the parallel power bus for delivering power from the corresponding power unit to the parallel power bus and for charging the corresponding power unit from the parallel power bus, the switch circuit changeable between connecting and disconnecting the corresponding power unit with the parallel power bus; and a bypass circuit around the switch circuit, coupleable to the corresponding power unit and the parallel power bus for delivering power from the corresponding power unit to the parallel power bus and for charging the corresponding power unit from the parallel power bus, the bypass circuit including a bidirectional power converter. The method includes selecting, from the plurality of power units, one or more power units to connect to the parallel power bus; and controlling, for each respective electrical power management module corresponding to the selected one or more power units, at least one of operation of the switch circuit or operation of the bypass circuit to connect the power unit to the parallel power bus through one of the switch circuit or the bypass circuit.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

FIGS. 3A, 3B, and 3C depict example operations of the parallel power distribution and charging system of FIG. 1.

Like reference numbers and designations in the various drawings indicate like elements.

DETAILED DESCRIPTION

Figure 1:
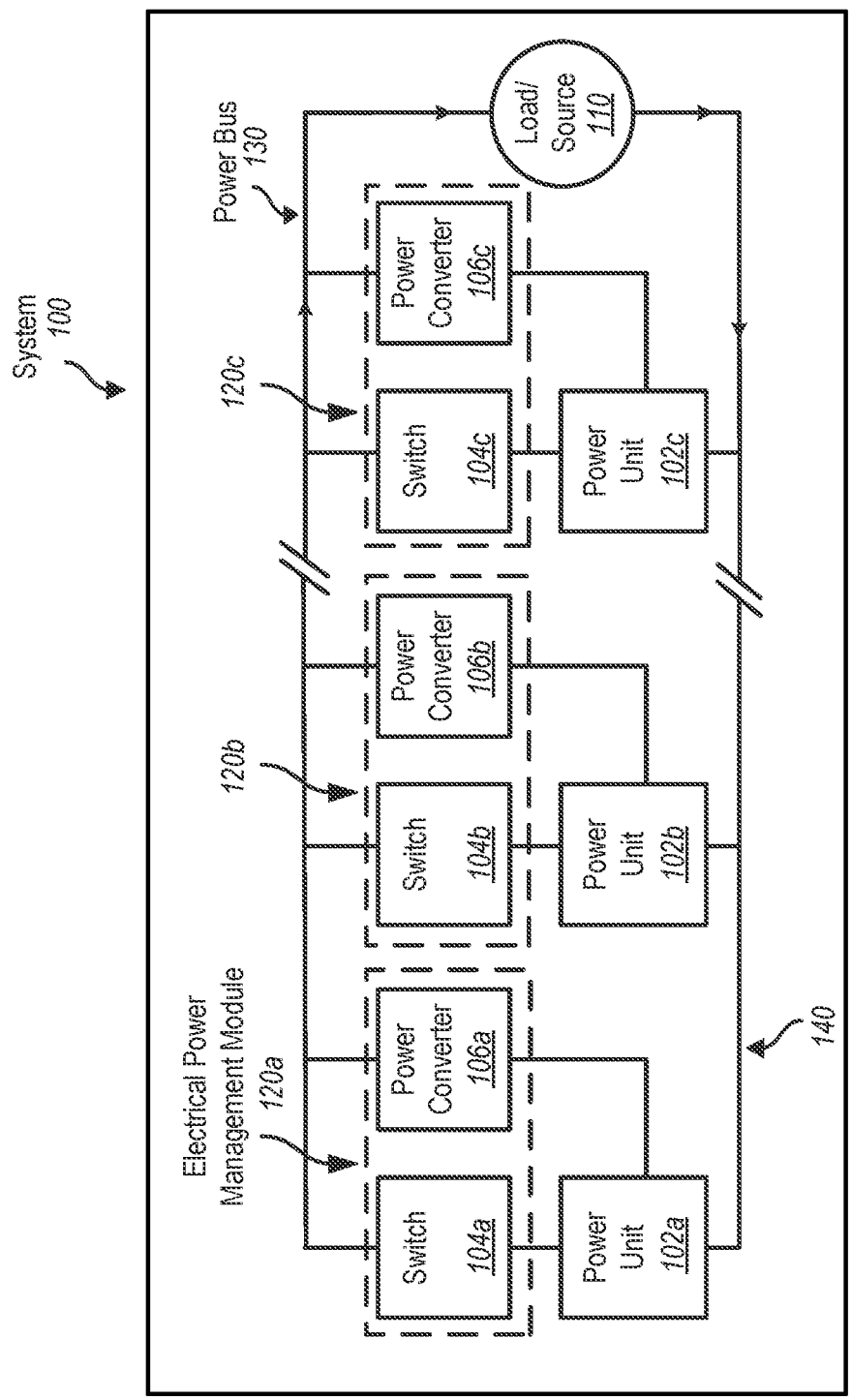
FIG. 1 depicts an example parallel power distribution and charging system including electrical power management modules according to an embodiment of invention.

FIG. 1 depicts an example parallel power distribution and charging system including electrical power management modules according to an embodiment of the invention. The system 100 is a system that consumes or delivers energy. The system 100 can include, for example, an electric vehicle, a photovoltaic power system, and/or another type of system.

The system 100 includes a load/source 110 and power bus 130. The power bus 130 is a parallel power bus that is electrically connected to the load/source 110. The system 100 includes power units 102a-c. Power units 102a-c are arranged in parallel with respect to the power bus 130.

In some examples, the load/source 110 is an electric motor, a power line, a power inverter, electrical machinery, a supercapacitor, a solar array, and/or another load on the power bus 130 and/or power source to the power bus 130. In some examples, the load/source 110 can alternate between operating as a load an operating as a source such as a charger. In some examples, the load/source 110 can have instances of regeneration, e.g., electric vehicle regeneration. If more than one load/source 110 is provided in a system 100, all of the load/sources 110 can be of the same type, or one or more or each of the load/sources 110 can be of a different type.

In some examples, the power units 102 are lead batteries, lithium-ion batteries, fuel cells, photovoltaic cells, solar cells, and/or another device for providing electrical power to the power bus 130. The power units 102 can also charge from the power bus 130. In some examples, the power units 102 can charge from regeneration circuitry 140. In a system 100 that has multiple power units 102, all of the power units 102 can be of the same type, or one or more or each of the power units 102 can be of a different type.

In an example context, the system 100 can be an electric vehicle. The load/source 110 can be an electric motor of the electric vehicle. The power units 102 can be batteries of the electric vehicle. The batteries can provide electrical power to the electric motor through the power bus 130. In some cases, the electric motor of a vehicle can provide electrical power to the batteries through the regeneration circuitry 140.

Figure 7:
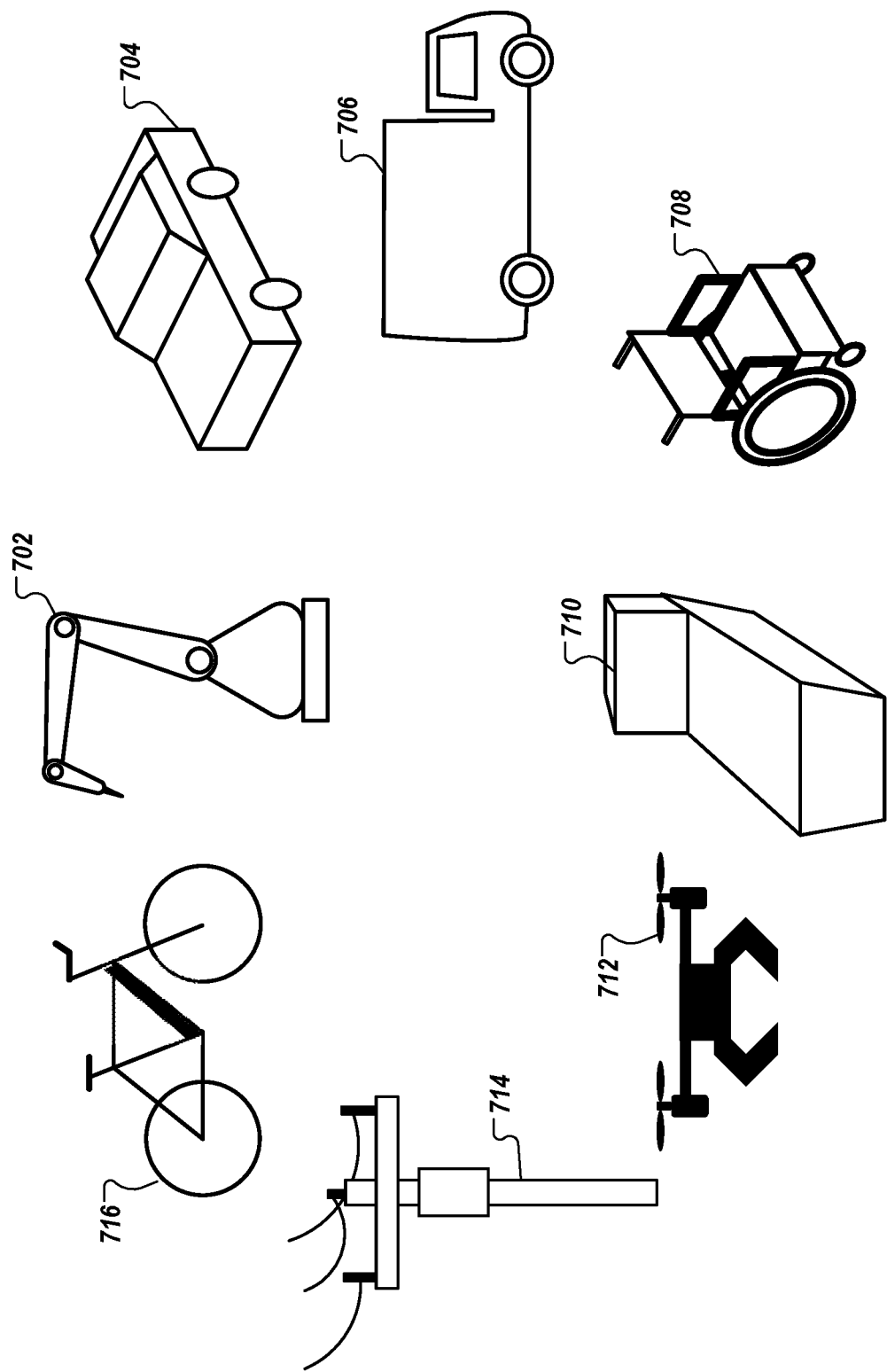
FIG. 7 depicts example systems that can be implemented with the disclosed systems and methods.

Example electric vehicles can include road-going vehicles, off-road vehicles, constructions equipment, rail vehicles, fixed-wing aerial vehicles, rotary wing aerial vehicles, surface marine vessels, submarine vessels, personal mobility vehicles, bicycles, and/or other types of vehicles. The disclosed systems and techniques need not be applied in the context of a vehicle, and can be applied in other contexts. For example, the system 100 can be a building, a power generation system, a power distribution system and/or another type of power generating system or power consuming system. Some example systems that can be implemented with the disclosed parallel power distribution and charging system are depicted in FIG. 7.

The system 100 includes electrical power management modules 120a-c. Each of the electrical power management modules 120a-c includes a switch 104 and a power converter 106 that are coupleable to a same power unit 102. When coupled to the power unit 102, the switch 104 and/or the power converter 106 are in electric continuity to communicate power to and/or from the power unit. For example, the electrical power management module 120a includes switch 104a and power converter 106a that are coupleable to power unit 102a. The electrical power management module 120b includes switch 104b and power converter 106b that are coupleable to power unit 102b. The electrical power management module 120c includes switch 104c and power converter 106c that are coupleable to power unit 102c.

The switches 104 each includes a switch circuit that is coupleable to the corresponding power unit 102 and to the power bus 130. When coupled to the power bus 130, the switch 104 and/or the power converter 106 are in electric continuity to communicate power to and/or from the power bus 130. For example, the switch 104a is coupleable to the power unit 102a and to the power bus 130 for delivering power from the power unit 102a to the power bus 130 and for charging the power unit 102a from the power bus 130. The switches 104 are each changeable between connecting and disconnecting the corresponding power unit 102 with the power bus 130.

The switches 104 can all be of the same type, or one or more or each of the switches can be of a different type. Each switch 104 is a bidirectional switch, a unidirectional switch, a diode, a single MOSFET switch, a bidirectional MOSFET switch, a contactor and/or another type of switch. In some examples, a switch 104 can operate in an "on" state and in an "off" state. When the switch 104 is in an "on" state, the switch 104 electrically connects the corresponding power unit 102 to the power bus 130. When a switch 104 is in an "off" state, the switch electrically disconnects the corresponding power unit 102 to the power bus 130.

The power converters 106 each are part of a bypass circuit around the corresponding switch circuit. For example, the power converter 106a is part of a bypass circuit around the switch 104a. The power converters 106 are coupleable to the corresponding power unit 102 and to the parallel power bus 130. For example, the power converter 106a is coupleable to the power unit 102a and to the power bus 130 for delivering power from the power unit 102a to the parallel power bus 130 and for charging the power unit 102a from the parallel power bus 130.

In some examples, the power converters 106 are bidirectional power converters. The power converters 106 can all be of the same type, or one or more or each of the power converters 106 can be of a different type. Each power converter 106 is a Buck converter, a Boost converter, a Buck-Boost converter, a dual active bridge, a resonant converter, and/or another type of power converter. The power converters 106 can each be configured to operate as a step-up converter in a first direction from the power unit to the parallel power bus, and to operate as a step-down converter in a second direction from the parallel power bus to the power unit.

Although FIG. 1 shows three sets of power units 102 and their corresponding electrical power management modules 120, the system 100 can include more or fewer sets of power units 102 and electrical power management modules 120. In some examples, the system 100 can include tens, hundreds, or even thousands of power units.

Figure 2A:
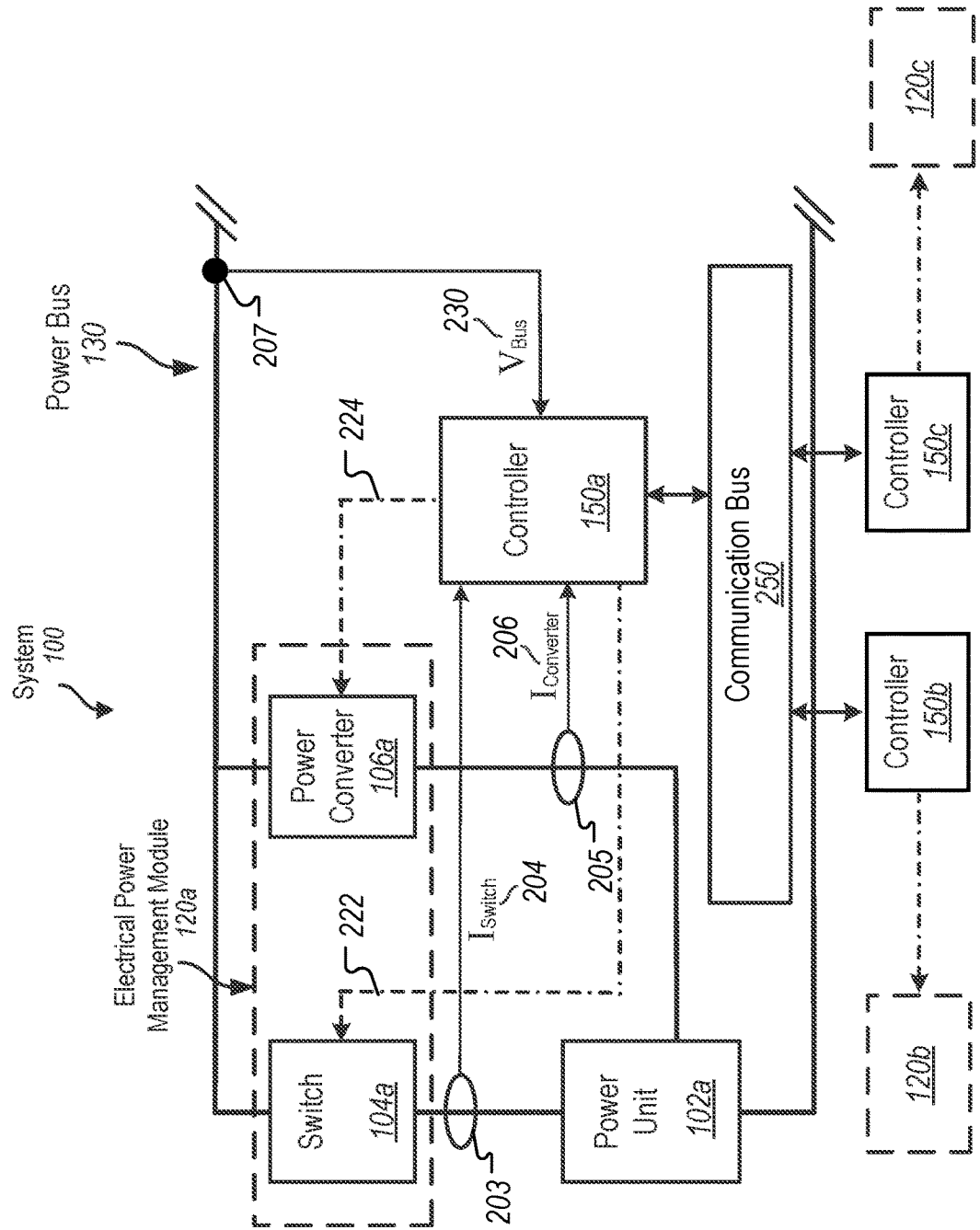
FIGS. 2A and 2B depict example communication and control systems of an electrical power management module of the parallel power distribution and charging system of FIG. 1.
Figure 2B:
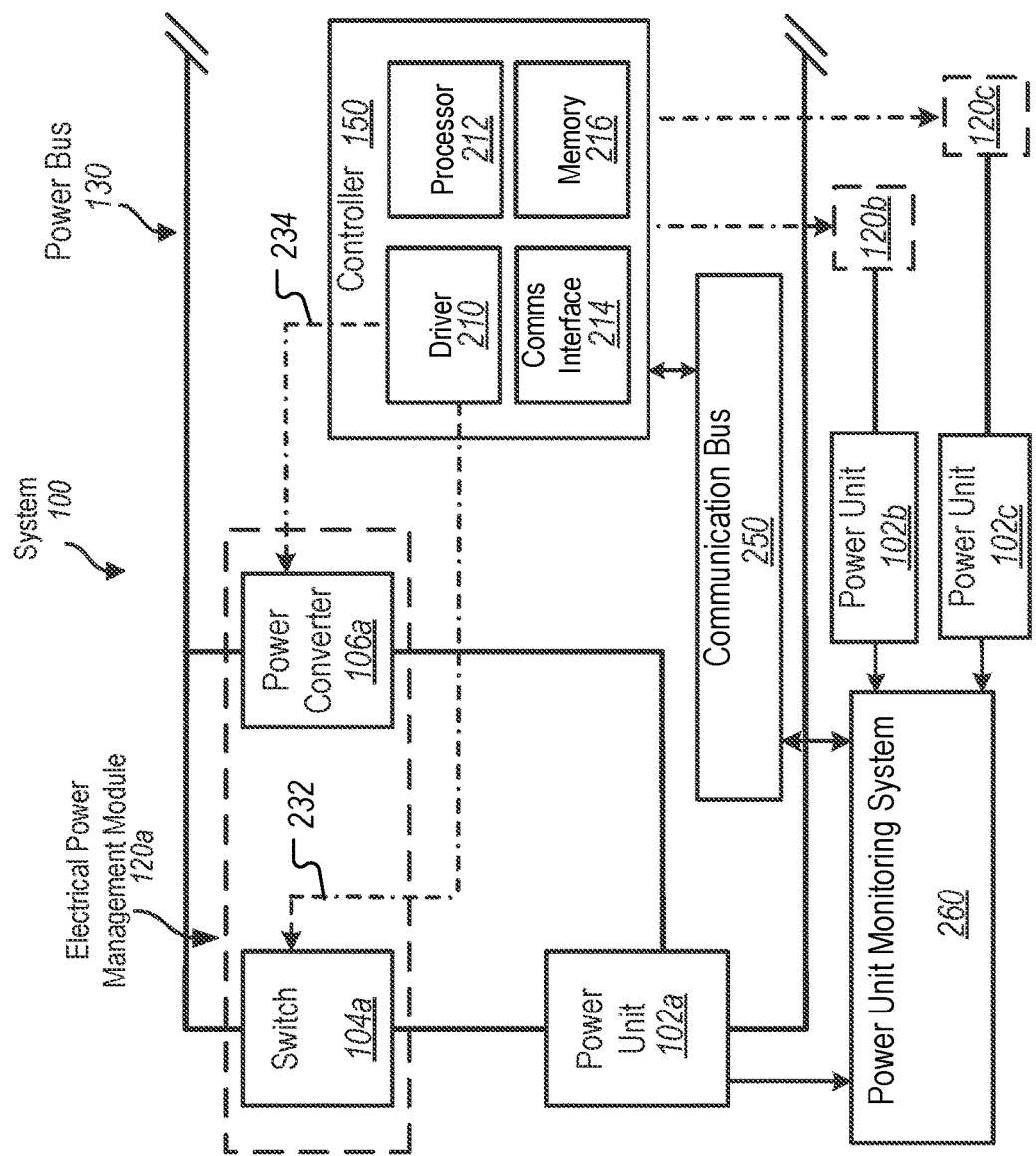

FIGS. 2A and 2B depict example communication, sensing and control systems of an electrical power management module 120a of the parallel power distribution and charging system according to an embodiment of the invention depicted in FIG. 1. In some examples, the system 100 can include multiple controllers. For example, the system 100 can include an individual controller for each electrical power management module 120. In some examples, the system 100 can include a central controller. For example, the system 100 can include one controller for all of the electrical power management modules 120. In some examples, the system 100 can include a central controller and an individual controller for each electrical power management module 120. In some examples, in addition to or instead of a controller, the electrical power management modules 120 can each include control circuitry, e.g., control circuitry integrated with the switch 104, the power converter 106, or both.

Though not depicted in FIGS. 2A and 2B, the system 100 can include a system controller for controlling aspects of the greater system. For example, in the context of an electric vehicle, the system controller is the electronic control unit of the electric vehicle. Control of the electrical power management modules 120 is performed based at least in part on control operations performed by the system controller.

FIG. 2A depicts an example communication and control system of an electrical power management module 120a. In the example of FIG. 2A, the electrical power management module 120a is controlled by an individual controller 150a. Electrical power management modules 120b and 120c are controlled by controllers 150b and 150c, respectively.

The controllers 150a-c communicate with each other over a communication bus 250. For example, the controllers 150 can each communicate, to each other controller 150, a status of the corresponding electrical power management module 120. The status of the electrical power management module 120 can include, for example, that the switch 104 is connecting the power unit 102 to the power bus 130, and that the power converter 106 is not connecting the power unit 102 to the power bus 130. In some examples, the status of the electrical power management module 120 can include a magnitude and/or a direction of current flowing between the power unit 102 and the power bus 130.

As an example, the controller 150a can communicate to the controllers 150b and 150c through the communication bus 250 a status of the electrical power management module 120a. The status of the electrical power management module 120a can include that the power converter 106a is connecting the power unit 102a to the power bus 130 and that the switch 104a is not connecting the power unit 102a to the power bus 130. The controller 150a can also communicate, to the controllers 150b and 150c through the communication bus 250, data indicating that magnitude of current flowing between the power unit 102a to the power bus 130 is five amps in the direction from the power unit 102a to the power bus 130 through the bypass circuit.

In some examples a controller, e.g., controller 150a, is a dedicated analog/digital circuit. In some examples, the controller 150a can include a processor, e.g., a microprocessor. The controller 150a can include a memory that stores instructions. When executed by the processor, the instructions cause the processor to perform operations. The operations of the processor of controller 150a can include, for example, determining to connect the power unit 102a to the power bus 130. In response to determining to connect the power unit 102a to the power bus 130, the operations can include controlling at least one of operation of the switch circuit, e.g., including switch 104a, or operation of the bypass circuit, e.g., including power converter 106a, to connect the power unit 102a to the power bus 130 through one of the switch circuit or the bypass circuit.

In some examples, the controller 150a can receive, through a communications circuit such as the communication bus 250, instructions to connect the power unit 102a to the power bus 130. For example, the controller 150a can receive instructions from a central controller that also controls operations of other electrical power management modules 120.

In some examples, the controller 150a can control operations of the electrical power management module 120a based on sensor data. The sensor data can include, for example, current sensor data for the switch circuit and the bypass circuit, and/or voltage sensor data for the power bus 130. In some examples, the system 100 includes a switch current sensor 203 and a converter current sensor 205. The switch current sensor 203 measures current $I_{Switch}$ 204 through the switch 104a. The converter current sensor 205 measures current $I_{Converter}$ 206 through the power converter 106a. The system can also include a bus voltage sensor 207. The bus voltage sensor 207 measures voltage $V_{Bus}$ 230 of the power bus 130. The controller 150a receives sensor data indicating the magnitudes of $I_{Switch}$ 204, $I_{Converter}$ 206, and $V_{Bus}$ 230.

The controller 150a can control the operations of the switch 104a and the power converter 106a based on the sensor data. For example, the controller 150a can determine an amount of current that should be drawn from the power unit 102a to the power bus 130 through the power converter 106a When the power unit 102a is providing electrical power to the power bus 130 through the power converter 106a, the controller 150a can compare the current $I_{Converter}$ 206 to the determined amount of current. If the current from the power unit 102 is less than or greater the determined amount of current, the controller 150 can control the power converter 106a to adjust the current of power unit 102 to more closely match the determined amount of current. In another example, when the power unit 102a is providing electrical power to the power bus 130 through the power converter 106a, the controller 150a can control operations of the power converter 106a to control the amount of current flowing to the power bus 130 Boost.

The controller 150 can control operations of the switch 104a and the power converter 106a using switch control signal 222 and converter control signal 224, respectively. Examples of control of operations of various switches and converters are described in greater detail with reference to FIGS. 4 and 5.

FIG. 2B depicts an example communication and control system of an electrical power management module 120a. In the example of FIG. 2B, the electrical power management module 120a is controlled by a central controller 150. The central controller 150 also controls operations of the electrical power management modules 120b and 120c.

The controller 150 is a dedicated digital circuit. The controller 150 includes a processor 212, a memory 216 that stores instructions, a driver 210, and a communications interface 214.

The controller 150 can control operations of the electrical power management module 120a by generating transmitting control signals to the electrical power management module 120a. For example, the driver 210 of the controller 150 can generate switch control signal 232 for transmitting to the switch 104a, and converter control signal 234 for transmitting to the power converter 106a. In some examples, the control signals can include pulse-width modulation (PWM) signals. In some examples, the control signals can include gating signals, e.g., gating signals that control operations of MOSFET switches.

The system 100 can include a power unit monitoring system 260. The power unit monitoring system 260 can include a processor, e.g., a microprocessor. The power unit monitoring system 260 can monitor a status of each of the power units 102. The status of a power unit 102 can include, for example, that the power unit 102 is connected to the power bus 130 or is disconnected from the power bus 130. In some examples, the status of the power unit 102 can include that the power unit 102 is providing electrical power to the power bus 130 or is charging from the power bus 130. In some examples, the status of the power unit 102 can include a magnitude of current flowing from the power unit 102 to the power bus 130 or from the power bus 130 to the power unit 102.

In some examples, the power unit monitoring system 260 can be a battery monitoring system. The power unit monitoring system 260 can monitor additional conditions of the power units 102. Conditions of the power units 102 include an age of each power unit 102, a temperature of each power unit 102, and/or other conditions. In some examples, the power unit monitoring system 260 can compare conditions of each power unit 102 to limits such as temperature limits, in order to prevent violation of the limits. When a particular power unit 102 approaches or reaches a limit, the power unit monitoring system 260 can communicate data to the controller 150, e.g., indicating that the power unit 102 is not available for providing electrical power to the power bus 130.

The status of the power unit 102a can also include a voltage, a charge state, or both, of the power unit 102a. In some examples, the voltage of the power unit 102a is related to the charge state of the power unit 102a. For example, the voltage of the power unit 102a can be proportional to the charge state of the power unit 102a.

As an example, the power unit monitoring system 260 can monitor a status of the power unit 102a. The status of the power unit 102a can include that the power unit 102a is connected to the power bus 130 and has a voltage of three volts. The power unit monitoring system 260 can also monitor the status that the power unit 102a is providing electrical power to the power bus 130 and that the magnitude of current flowing from the power unit 102a to the power bus 130 is ten amps.

The power unit monitoring system 260 can communicate the status of the power units 102 to the controller 150, e.g., through the communication bus 250 and the communications interface 214 of the controller 150. Based on the status of the power units 102, the controller 150 can select power units 102 to connect to the power bus 130. The controller 150 can also determine to connect each selected power unit 102 to the power bus 130 through one of the corresponding switch 104 or the corresponding power converter 106.

In some examples, the controller 150 can determine an amount of current that is required by the load/source 110. Based on the status of each power unit 102, the controller 150 can select, from the power units 102, a subset of power units to provide the required amount of current to the power bus 130. The controller can therefore transmit control signals, e.g., switch control signal 232, converter control signal 234, or both, to each of the electrical power management modules 120 of the subset that cause the corresponding power units 102a to connect to the power bus 130 through one of the switch circuit or the bypass circuit.

In some examples, the controller 150 can select the power units 102 to connect to the power bus 130 based on a charge state of each power unit 102. In some examples, of all power units have same charge within a specified tolerance, the controller 150 can select all of the power units 102 to connect to the power bus 130 through the switches 104.

In some examples, the controller 150 can determine an electrical current to draw from a power unit to provide power to the parallel power bus, and can control operations of the bypass circuit to draw the determined electrical current from the power unit. For example, the controller 150 can determine to draw ten amps from power unit 102a, and can control the power converter 106a to draw ten amps from the power unit 102a. In some examples, the controller 150 can determine the electrical current to draw from the power unit based at least in part on a charge state of the power unit. For example, the power unit 102a may have a higher charge state than the power unit 102b. The controller may determine, based on the relative charge states between power unit 102a and the power unit 102b, to draw more current from the power unit 102a than from the power unit 102b.

In an example scenario, power unit 102a may have a charge state of ninety percent, power unit 102b may have a charge state of sixty percent, and power unit 102c may have a charge state of thirty percent. The controller 150 may determine that two power units 102 out of three total power units 102 are needed to provide electrical power to the power bus. The controller 150 may select power units 102a and 102b to connect to the power bus 130, due to power units 102a and 102b having the two highest charge states. The controller 150 might not select the power unit 102c, due to power unit 102c having the lowest charge state.

In some examples, the controller 150 can control operations of the electrical power management modules 120 in order to control the current flowing to and from each of the power units 102. For the above example, based on the power unit 102a having a higher charge state than the power unit 102b, the controller 160 can determine to draw a higher current from power unit 102a than from power unit 102. The controller 150 can therefore control operations of the electrical power management modules 120a and 120b such that a higher current is drawn from power unit 102a compared to power unit 102b. In this way, the controller 150 can establish and/or maintain a charge balance between multiple power units 102.

Figure 3A:
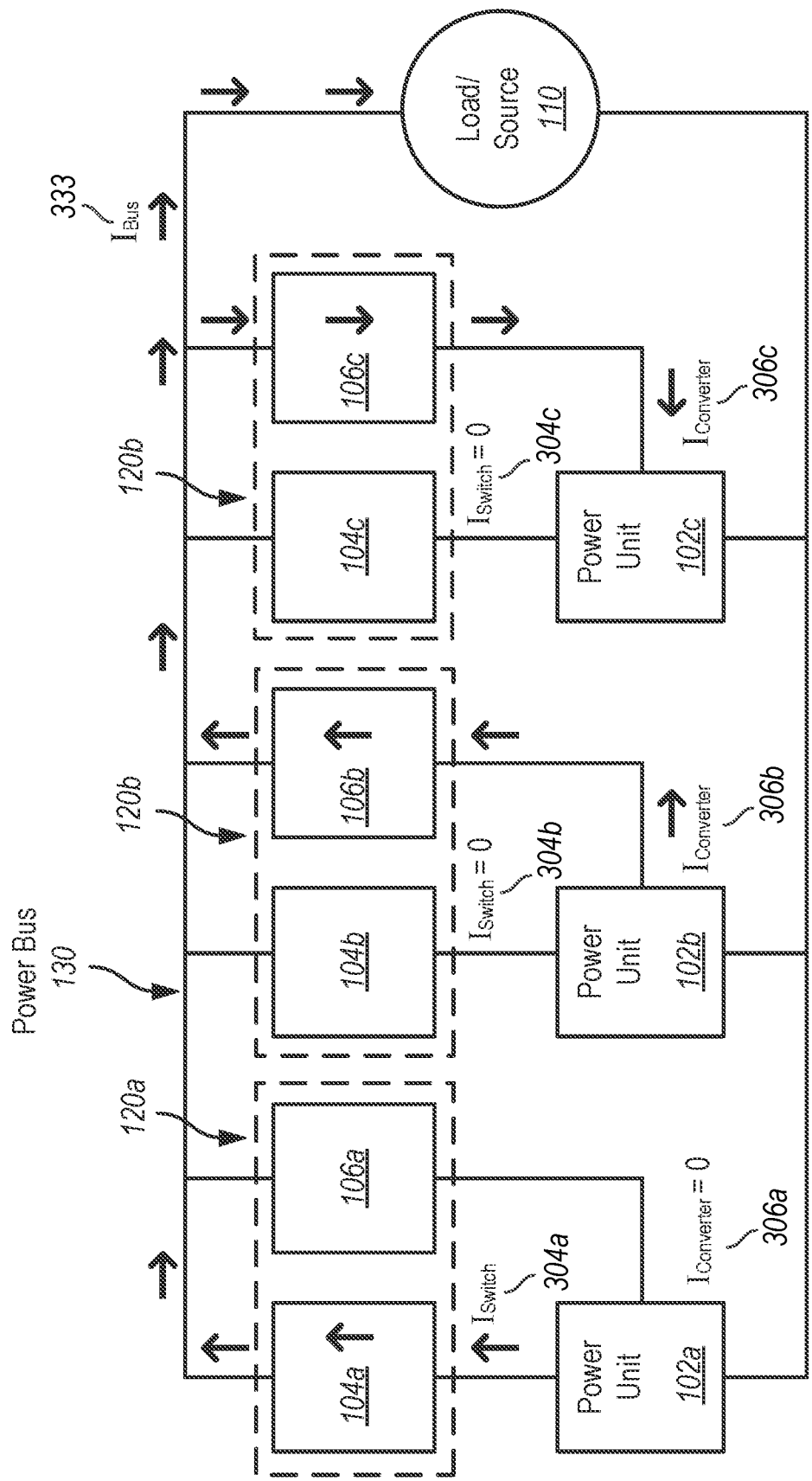
Figure 3B:
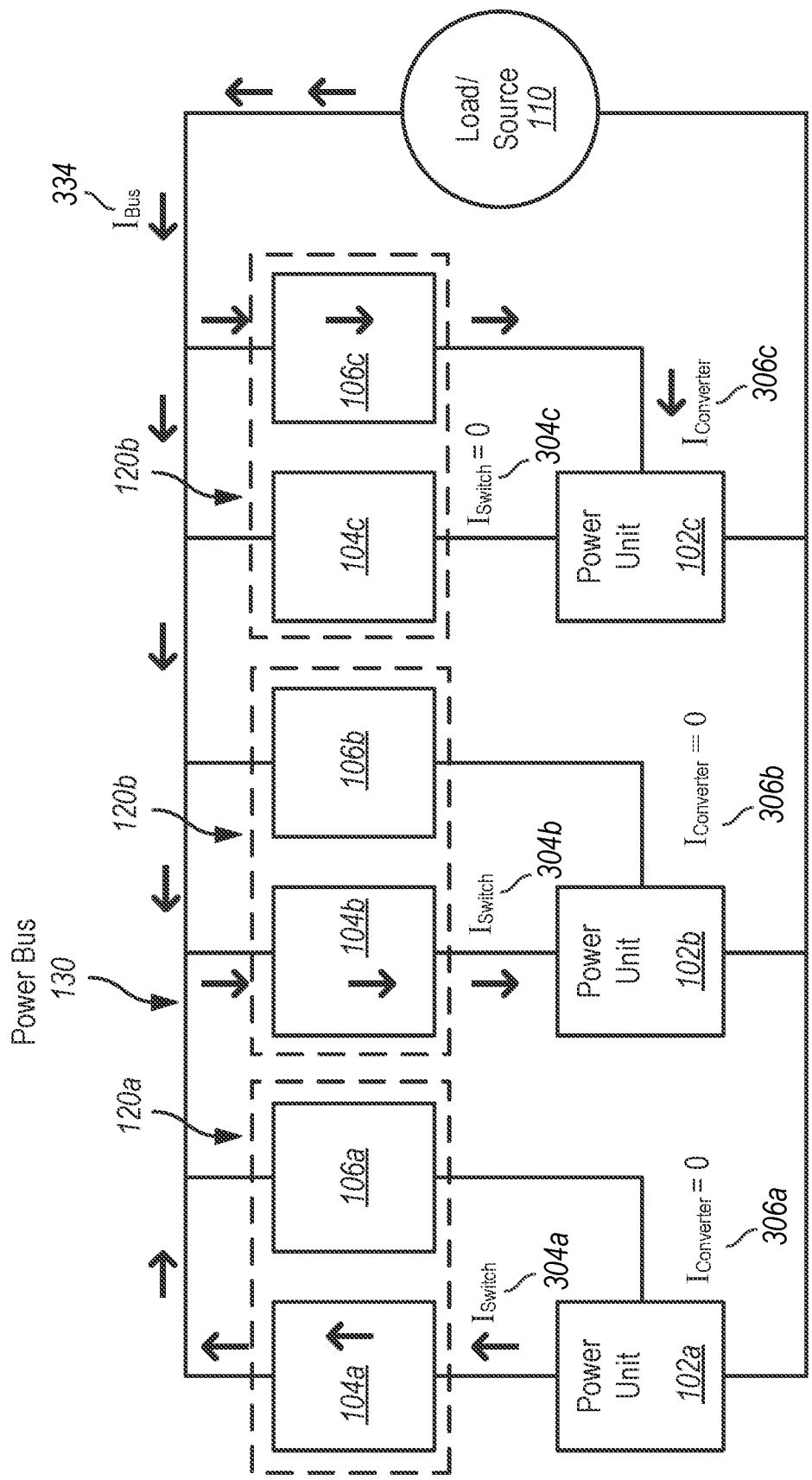

FIGS. 3A, 3B, and 3C depict example operations of the parallel power distribution and charging system 100 of FIGS. 1 and 2. The controller 150 of the system 100 can control operations of the system 100 by controlling, for each electrical power management module 120 operation of the switch circuit or operation of the bypass circuit to connect the corresponding power unit to the power bus through one of the switch circuit or the bypass circuit.

Various configurations of electrical power management modules are depicted in FIGS. 3A and 3B. Other configurations are possible. FIG. 3C is a table 300 showing a number of different operating modes of an example system that includes three power units. Any number of power units can be connected to the power bus to provide power to the power bus, can be connected to the power bus to charge from the power bus, or can be disconnected from the power bus. Additionally, any number of power units can charge from regeneration circuitry 140. For example, for a system 100 including three power units, an example operating mode includes a first power unit providing electrical power to the power bus 130, a second power unit receiving power from the power bus 130, and a third power unit being disconnected from the power bus 130. This example operating mode is represented by Mode 6 in table 300.

FIG. 3A shows example operations in which a first power unit 102a provides electrical energy to the power bus 130 through the switch 104a, a second power unit 102b provides electrical energy to the power bus 130 through the power converter 106b, and a third power unit 102c charges from the power bus 130 through the power converter 106c. The example operating mode depicted in FIG. 3A is represented by Mode 7 in table 300.

The power unit 102a and the power unit 102b can be selected by the controller 150 to provide electrical power to the power bus 130. For example, the controller 150 can determine a charge state, e.g., a voltage, of each of the power units 102a-c. The controller 150 may determine that the power unit 102a has a highest charge state, that the power unit 102b has a lower charge state than the power unit 102a, and that the power unit 102c has a lower charge state than both the power unit 102a and 102b. The controller 150 can select the power units 102a and 102b to provide electrical power to the power bus 130 based at least in part on a charge state of the power units 102a and 102b being higher than the charge state of the power unit 102c.

In some examples, the controller 150 can identify a power unit that has a highest charge state of the power units that are selected to provide electrical power to the power bus 130. The controller 150 can control the switch circuit of the electrical power management module corresponding to the identified power unit to connect the identified power unit to the parallel power bus through the switch circuit. For example, the controller 150 can identify that the power unit 102a as having a highest charge state of the selected power units 102a and 102b. The controller 150 can control the switch 104a of the electrical power management module 120a to connect the power unit 102a to the power bus 130 through the switch 104a. For each of the plurality of power units, excluding the identified power unit, the controller 150 can control the bypass circuit of the corresponding electrical power management module to connect the power unit to the power bus 130 through the bypass circuit. For example, the controller 150 can control the power converter 106b of the electrical power management module 120b to connect the power unit 102b to the power bus 130 through the power converter 106b.

In some examples, the controller 150 can determine to connect a power unit 102 to the power bus 130 to provide electrical power to the parallel power bus, and can determine a voltage difference between a voltage of the power bus 130 and a voltage of the power unit 102. The controller 150 can compare the voltage difference to a specified threshold voltage difference. Based on the voltage difference being less than the specified threshold voltage difference, the controller 150 can control operation of the switch circuit to cause the power unit 102 to provide electrical power to the parallel power bus through the switch circuit.

As an example, the controller 150 can determine to connect the power unit 102a to the power bus 130 and can determine a voltage difference between a voltage of the power bus 130 and a voltage of the power unit 102a. Based on the voltage difference being less than the specified voltage difference, the controller 150 can control operation of the switch 104a to cause the power unit 102a to provide electrical power to the power bus 130 through the switch 104a. As a result, electrical current $I_{Switch}$ 304a flows through the switch 104a in a direction from the power unit 102a to the power bus 130, and no electrical current $I_{Converter}$ 306a flows through the power converter 106a. When the power unit 102a is connected to the power bus 130 through the switch 104a, the voltage of the power unit and the voltage of the power bus 130 are equal.

In some examples, the controller 150 can determine to connect a power unit 102 to the power bus 130 to provide electrical power to the parallel power bus, and can determine a voltage difference between a voltage of the power bus 130 and a voltage of the power unit 102. The controller 150 can compare the voltage difference to a specified threshold voltage difference. Based on the voltage difference exceeding the specified threshold voltage difference, the controller 150 can control operation of the bypass circuit to cause the power unit 102 to provide electrical power to the parallel power bus through the bypass circuit.

As an example, the controller 150 can determine to connect the power unit 102b to the power bus 130 and can determine a voltage difference between a voltage of the power bus 130 and a voltage of the power unit 102b. Based on the voltage difference exceeding the specified voltage difference, the controller 150 can control operation of the power converter 106b to cause the power unit 102b to provide electrical power to the power bus 130 through the power converter 106b. As a result, electrical current $I_{Converter}$ 306b flows through the power converter 106b in a direction from the power unit 102b to the power bus 130, and no electrical current $I_{Switch}$ 304b flows through the switch 104b.

In some examples, the controller 150 can control operation of the bidirectional power converter to Boost electrical current from the power unit to the power bus. For example, the controller 150 can control operation of the power converter 106b to Boost electrical current from the power unit 102b to the power bus 130 that is at a higher voltage than the power unit 102b.

In some examples, the controller 150 can determine to connect a power unit 102 to the power bus 130 to charge from the power bus 130. The controller 150 can compare the voltage difference to a specified threshold voltage difference. Based on the voltage difference exceeding the specified threshold voltage difference, the controller 150 can control operation of the bypass circuit to cause the power unit 102 to charge from the parallel power bus through the bypass circuit.

As an example, the controller 150 can determine to connect the power unit 102c to the power bus 130. The controller 150 can determine a voltage difference between a voltage of the power bus 130 and a voltage of the power unit 102c. Based on the voltage difference exceeding a specified voltage difference, the controller 150 can control operation of the power converter 106c to cause the power unit 102c to charge from the power bus 130 through the power converter 106b. As a result, electrical current $I_{Converter}$ 306c flows through the power converter 106c in a direction from the power bus 130 to the power unit 102c, and no electrical current $I_{Switch}$ 304c flows through the switch 104b.

In some examples, the controller 150 can control operation of the bidirectional power converter to feed electrical current from the power bus to the power unit. For example, the controller 150 can control operation of the power converter 106c to feed electrical current from the power bus 130 to the power unit 102c.

As shown in FIG. 3A, the power units 102a and 102b provide electrical power to the power bus 130, while the power bus 130 charges the power unit 102c. The load/source 110 operates as a load on the power bus 130, and current $I_{Bus}$ 333 flows to the load/source 110.

FIG. 3B shows example operations in which a first power unit 102a provides electrical energy to the power bus 130 through the switch 104a, a second power unit 102b charges from the power bus 130 through the switch 104b, and a third power unit 102c charges from the power bus 130 through the power converter 106c. The example operating mode depicted in FIG. 3B is represented by Mode 8 in table 300.

Operations of the electrical power management module 120a in FIG. 3B are similar to operations of the electrical power management module 120a as described with reference to FIG. 3A. Operations of the electrical power management module 120c in FIG. 3B are similar to operations of the electrical power management module 120c as described with reference to FIG. 3A.

The power unit 102b and the power unit 102c can be selected by the controller 150 to receive electrical power from the power bus 130. For example, the controller 150 can determine a charge state, e.g., a voltage, of each of the power units 102a-c. The controller 150 may determine that the power unit 102a has a highest charge state, that the power unit 102b has a lower charge state than the power unit 102a, and that the power unit 102c has a lower charge state than both the power unit 102a and 102b. The controller 150 can select the power units 102b and 102c to receive electrical power from the power bus 130 based at least in part on a charge state of the power units 102b and 102c being lower than the charge state of the power unit 102a.

In some examples, as illustrated in FIG. 3B, the controller 150 can determine to connect a power unit 102 to the power bus 130 to charge from the parallel power bus, and can determine a voltage difference between a voltage of the power bus 130 and a voltage of the power unit 102. The controller 150 can compare the voltage difference to a specified threshold voltage difference. Based on the voltage difference being less than the specified threshold voltage difference, the controller 150 can control operation of the switch circuit to cause the power unit 102 to charge from the parallel power bus through the switch circuit.

As an example, the controller 150 can determine to connect the power unit 102b to the power bus 130 and can determine a voltage difference between a voltage of the power bus 130 and a voltage of the power unit 102b. Based on the voltage difference being less than the specified voltage difference, the controller 150 can control operation of the switch 104b to cause the power unit 102b to charge from the power bus 130 through the switch 104b. As a result, electrical current $I_{Switch}$ 304b flows through the switch 104b in a direction from the power bus 130 to the power unit 102b, and no electrical current $I_{Converter}$ 306b flows through the power converter 106b.

As shown in FIG. 3B, the power unit 102a provides electrical power to the power bus 130, while the power bus 130 charges the power units 102b and 102c. The load/source 110 operates as a source to the power bus 130, and current $I_{Bus}$ 334 flows from the load/source 110.

FIGS. 4A, 4B, 4C, and 4D are schematic diagrams of example electrical power management modules according to the present disclosure. The example electrical power management modules in FIGS. 4A to 4D each use a half bridge configuration with transistors Q3 and Q4 and an inductor 410a which can operate as a Buck and/or Boost converter topologies. A Buck converter is a switching converter with a voltage output lower than voltage input. Buck converters can deliver power from a higher voltage to a lower voltage used, e.g., from the power bus 130 to a power unit 402a in FIG. 4A. A Boost converter is a switching converter that can deliver power from to a voltage output higher than voltage input. Boost converters can be used to feed current from the power unit 402a at a lower voltage level to the power bus 130 at a higher voltage level. Buck-Boost converters can feed current from lower voltages to higher voltages, or from higher voltages to lower voltages. Buck-Boost converters can include any appropriate semiconductor switch, e.g., BJT, MOSFET or IGBT switches. In this disclosure, the example implementations primarily include MOSFET switches.

Figure 4A:
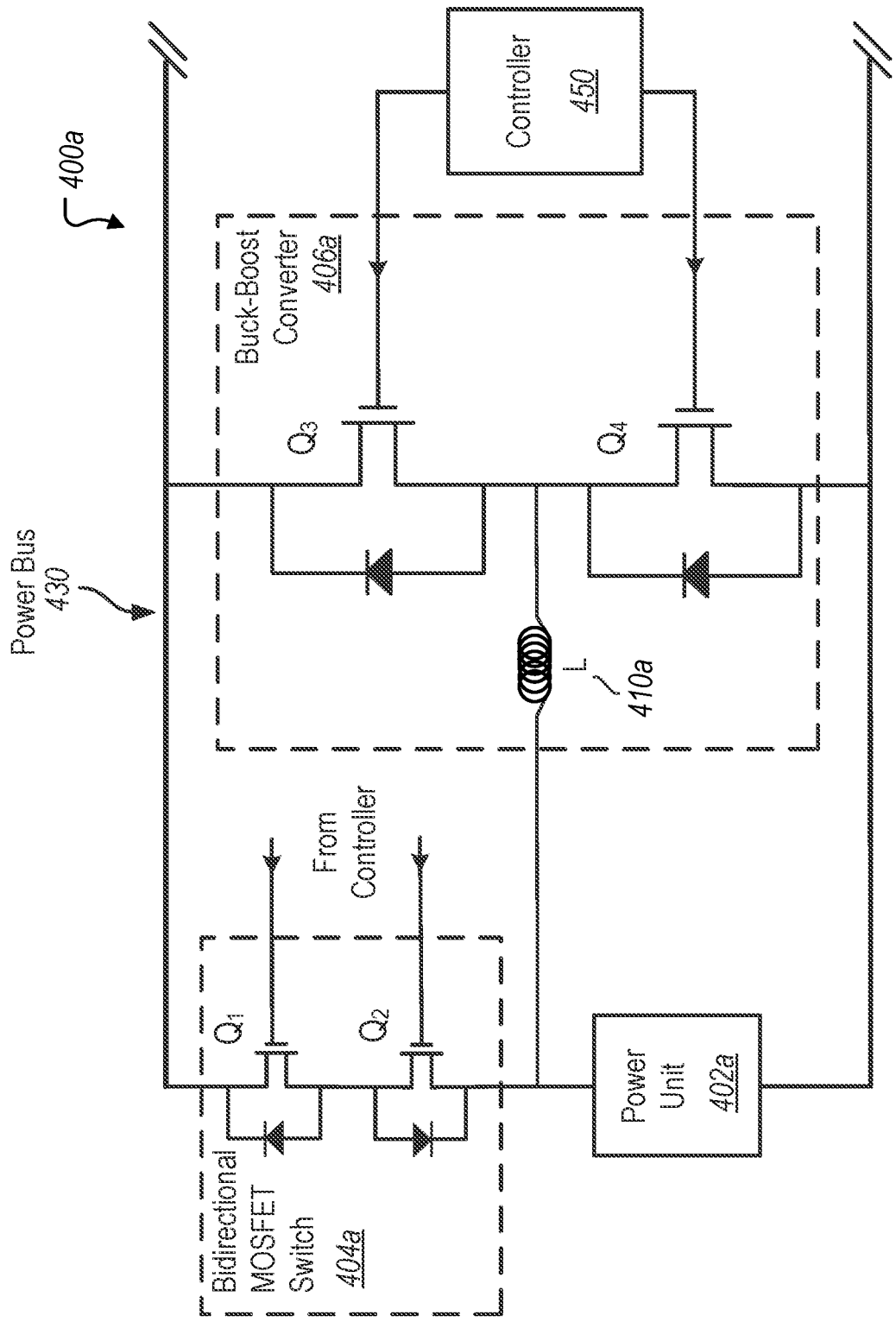
FIGS. 4A, 4B, 4C, and 4D are schematic diagrams of example electrical power management modules that use Buck and Boost topologies.

Referring to FIG. 4A, the electrical power management module 400a includes, in the bypass circuit, Buck-Boost converter 406a. Buck-Boost converter 406a includes MOSFET switches $Q_3$ and $Q_4$, including their respective body diodes, and inductor 410a. The controller 450 can operate the Buck-Boost converter 406a by continuously turning "on" and "off" the switches $Q_3$, $Q_4$ according to a duty cycle. The controller 450 controls the Buck-Boost converter 411a using control signals to apply gate voltages to the switches $Q_3$, $Q_4$. The controller 450 can adjust an amount of current flowing through the switches $Q_3$, $Q_4$ by adjusting the duty cycle of the control signal. The Buck-Boost converter 406a can also be operated to block current flow between the power unit 402a and the power bus 430 through the bypass circuit. For example, the controller 450 can turn both $Q_3$ and $Q_4$ off in order to create an open circuit between the power unit 402a and the power bus 430 through the bypass circuit.

The electrical power management module 400a includes, in the switch circuit, bidirectional MOSFET switch 404a. Bidirectional MOSFET switch 404a includes switches $Q_1$ and $Q_2$ connected in series between the power unit 402a and the power bus 430. The controller 450 controls the bidirectional MOSFET switch 404a using a control signal to apply gate voltages to the switches $Q_1$ and $Q_2$.

The bidirectional MOSFET switch 404a can be operated to permit current to flow through the switch 404a from the power unit 402a to the power bus 430, or from the power bus 430 to the power unit 402a. For example, the controller 450 can turn $Q_1$ "on" to permit current to flow from the power bus 430 to the power unit 402a. The controller 450 can turn $Q_2$ "on" to permit current to flow from the power unit 402a to the power bus 430. The bidirectional MOSFET switch 404a can also be operated to block current flow between the power unit 402a and the power bus 430 through the switch. For example, the controller 450 can turn both $Q_1$ and $Q_2$ off in order to create an open circuit between the power unit 402a and the power bus 430.

Figure 4B:
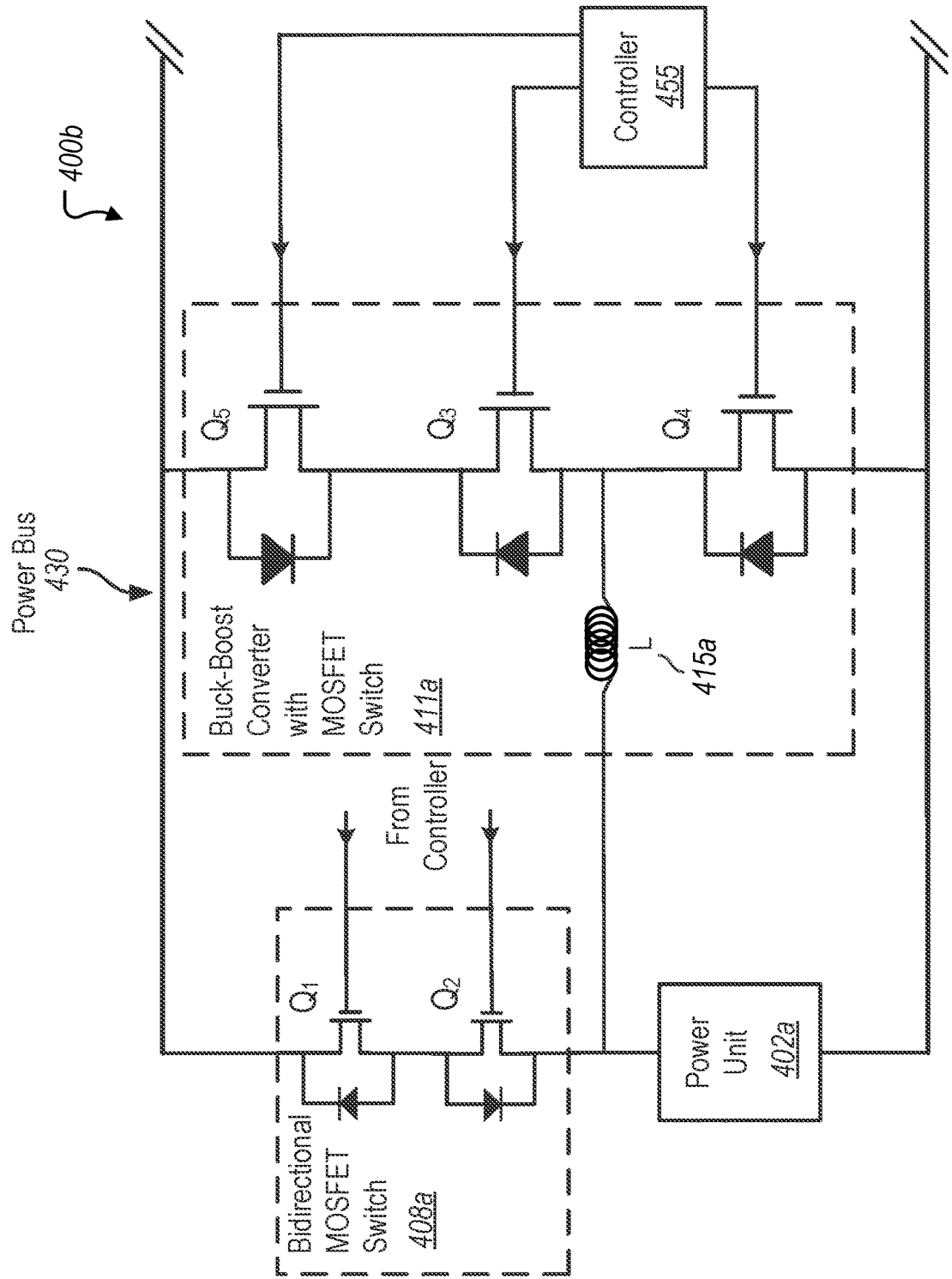

Referring to FIG. 4B, the electrical power management module 400b includes, in the bypass circuit, Buck-Boost converter 411a. Buck-Boost converter 411a includes MOSFET switches $Q_3$, $Q_4$, and $Q_5$, including their respective body diodes, and inductor 415a. As described with reference to FIG. 4A, the controller 455 can operate the Buck-Boost converter 411a by continuously turning "on" and "off" the switches $Q_3$, $Q_4$ according to a duty cycle. The controller 455 controls the Buck-Boost converter 411a using control signals to apply gate voltages to the switches $Q_3$, $Q_4$.

The controller 455 can adjust an amount of current flowing through the switches $Q_3$, $Q_4$ by adjusting the duty cycle of the control signals. The switches can also be operated to block current flow between the power unit 402a and the power bus 430 through the bypass circuit. For example, the controller 455 can turn both $Q_3$ and $Q_4$ off in order to create an open circuit between the power unit 402a and the power bus 430 through the bypass circuit.

The MOSFET switch $Q_5$ can prevent current from flowing from the power unit 402a to the power bus 430 through the body diode of $Q_3$ when $Q_3$ is off. The body diode of $Q_5$ opposes the body diode of $Q_3$. Thus, $Q_5$ can isolate the power unit 402a from the power bus 430 through the bypass circuit when $Q_3$ is off.

The electrical power management module 400a includes, in the switch circuit, bidirectional MOSFET switch 408a. Bidirectional MOSFET switch 408a includes switches $Q_1$ and $Q_2$ connected in series between the power unit 402a and the power bus 430. As described with reference to FIG. 4A, the controller 455 controls the bidirectional MOSFET switch 408a using a control signal to apply gate voltages to the switches $Q_1$ and $Q_2$.

Figure 4C:
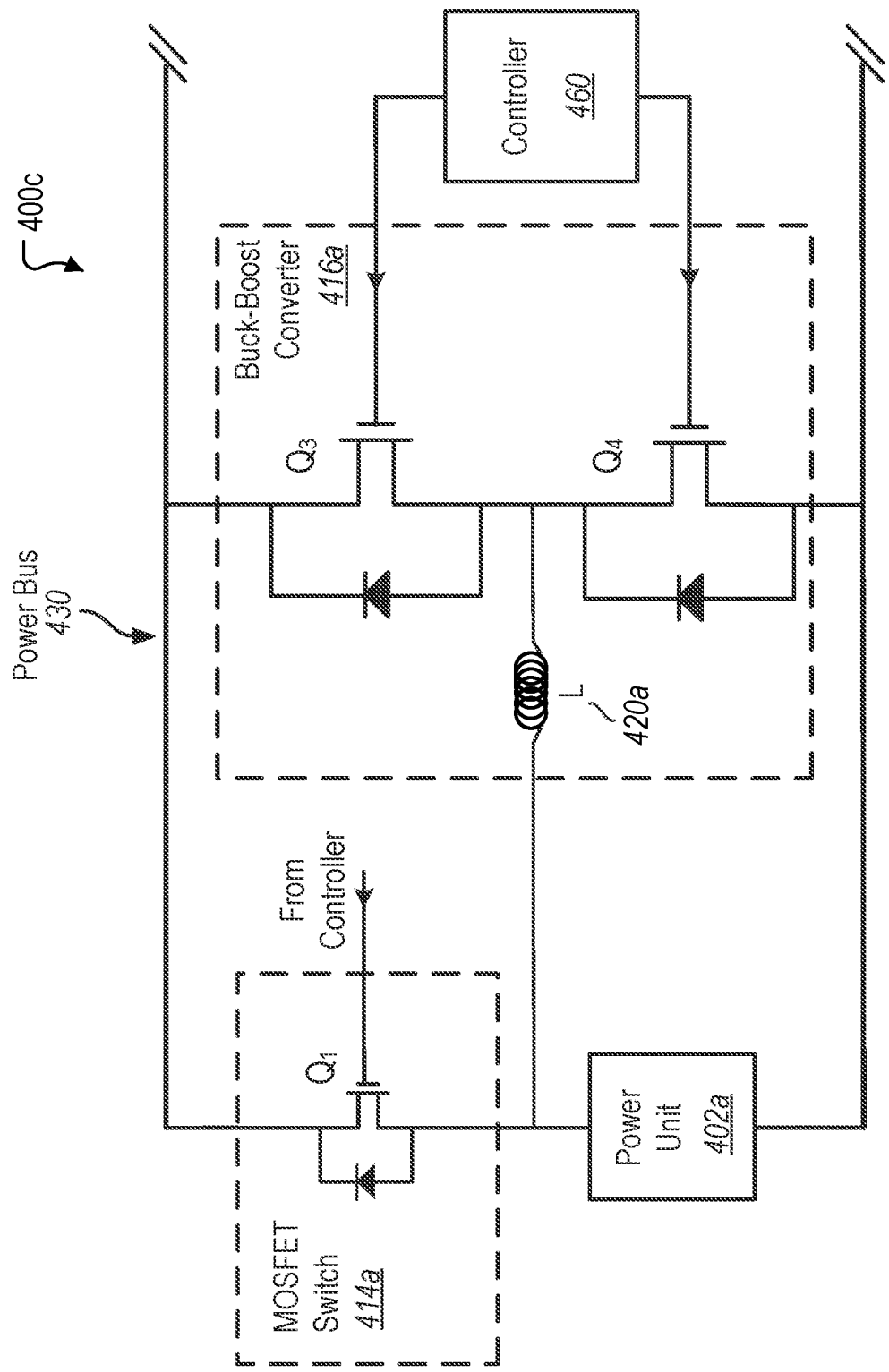

Referring to FIG. 4C, the electrical power management module 400c includes, in the bypass circuit, Buck-Boost converter 416a. Buck-Boost converter 416a includes MOSFET switches $Q_3$ and $Q_4$, including their respective body diodes, and inductor 420a. As described with reference to FIG. 4A, the controller 460 can operate the Buck-Boost converter 416a by continuously turning "on" and "off" the switches $Q_3$, $Q_4$ according to a duty cycle.

The electrical power management module 400c includes, in the switch circuit, unidirectional MOSFET switch 414a. Unidirectional MOSFET switch 414a includes switch $Q_1$ between the power unit 402a and the power bus 430. The controller 460 controls the unidirectional MOSFET switch 414a using a control signal to apply gate voltages to the switch $Q_1$.

The unidirectional MOSFET switch 404a can be operated to permit current to flow through the switch 414a from the power unit 402a to the power bus 430. The unidirectional MOSFET switch 404a can prevent current flow from the power bus 430 to the power unit 402a. For example, the controller 450 can turn $Q_1$ "on" to permit current to flow from the power bus 430 to the power unit 402a. The unidirectional MOSFET switch 414a can also be operated to block current flow between the power unit 402a and the power bus 430 through the switch. For example, the controller 460 can turn $Q_1$ off in order to create an open circuit between the power unit 402a and the power bus 430.

Figure 4D:
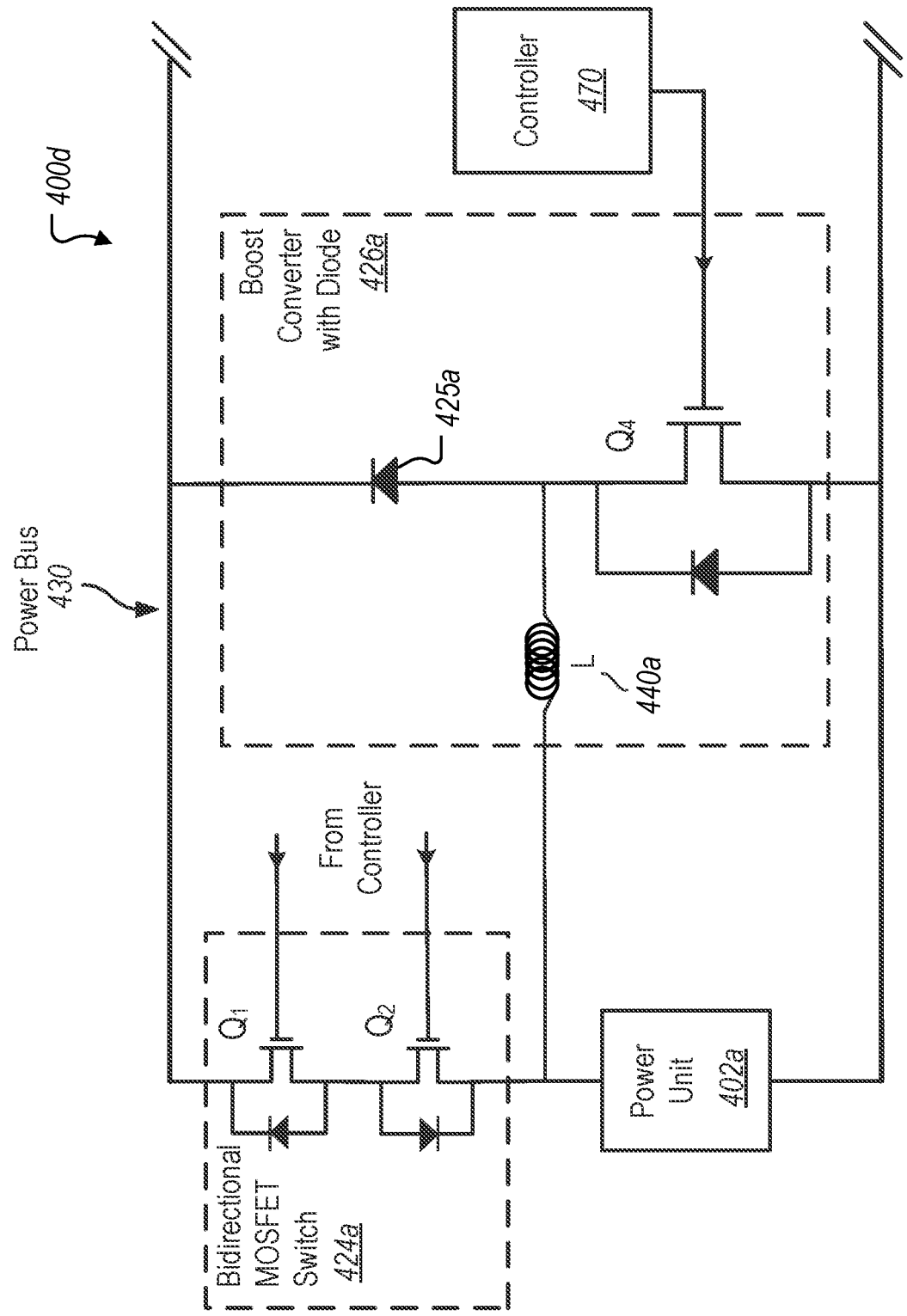

Referring to FIG. 4D, the electrical power management module 400d includes, in the bypass circuit, Boost converter 426a. Boost converter 426a includes MOSFET switches $Q_3$ and $Q_4$, including their respective body diodes, diode 425a, and inductor 440a. The controller 470 can operate the Boost converter 426a by continuously turning "on" and "off" the switch $Q_4$ according to a duty cycle. The diode 425a can prevent current from flowing from the power bus 430 to the power unit 402a through the bypass circuit.

The electrical power management module 400d includes, in the switch circuit, bidirectional MOSFET switch 404a. Bidirectional MOSFET switch 404a includes switches $Q_1$ and $Q_2$ connected in series between the power unit 402a and the power bus 430. As described with reference to FIG. 4A, the controller 470 controls the bidirectional MOSFET switch 424a using a control signal to apply gate voltages to the switches $Q_1$ and $Q_2$.

Figure 5:
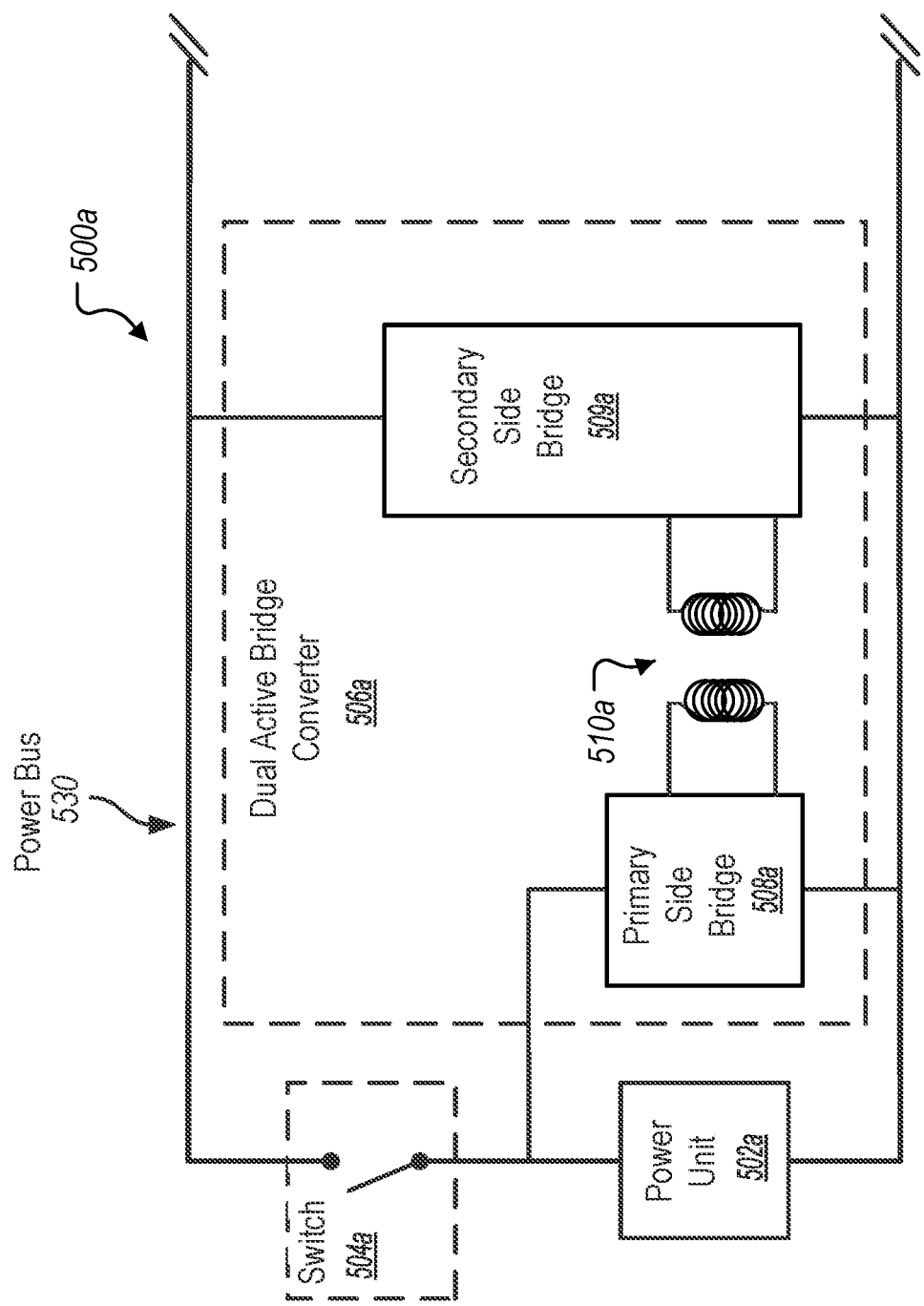
FIG. 5 is a schematic diagram of an example electrical power module that uses a dual active bridge topology.

FIG. 5 is a schematic diagram of an example electrical power module 500a that uses a dual active bridge topology. A dual active bridge converter is a bidirectional converter with primary and secondary side bridges, a high frequency transformer, and an energy transfer inductor. The two legs of both full-bridges are driven with complimentary square-wave pulses. Power flow in the dual active bridge can be directed by phase-shifting the pulses of one bridge with respect to the other using phase shift modulation.

The electrical power management module 500a includes, in the bypass circuit, dual active bridge converter 506a. Dual active bridge converter 506a includes primary side bridge 508, secondary side bridge 509a, and transformer 510a. A controller can operate the dual active bridge converter 506a by driving gates of the primary side bridge 508 and the secondary side bridge 509a.

The electrical power management module 500a includes, in the switch circuit, bidirectional switch 504a. A controller can control the bidirectional switch 504a using a control signal to shut and open the switch 504a. The controller can turn the bidirectional switch 504a "on" to permit current to flow between the power bus 530 and the power unit 502a through the switch 504a. The controller can turn the bidirectional switch 504a "off" to block current flow between the power unit 502a and the power bus 530 through the switch 504a.

Figure 6:
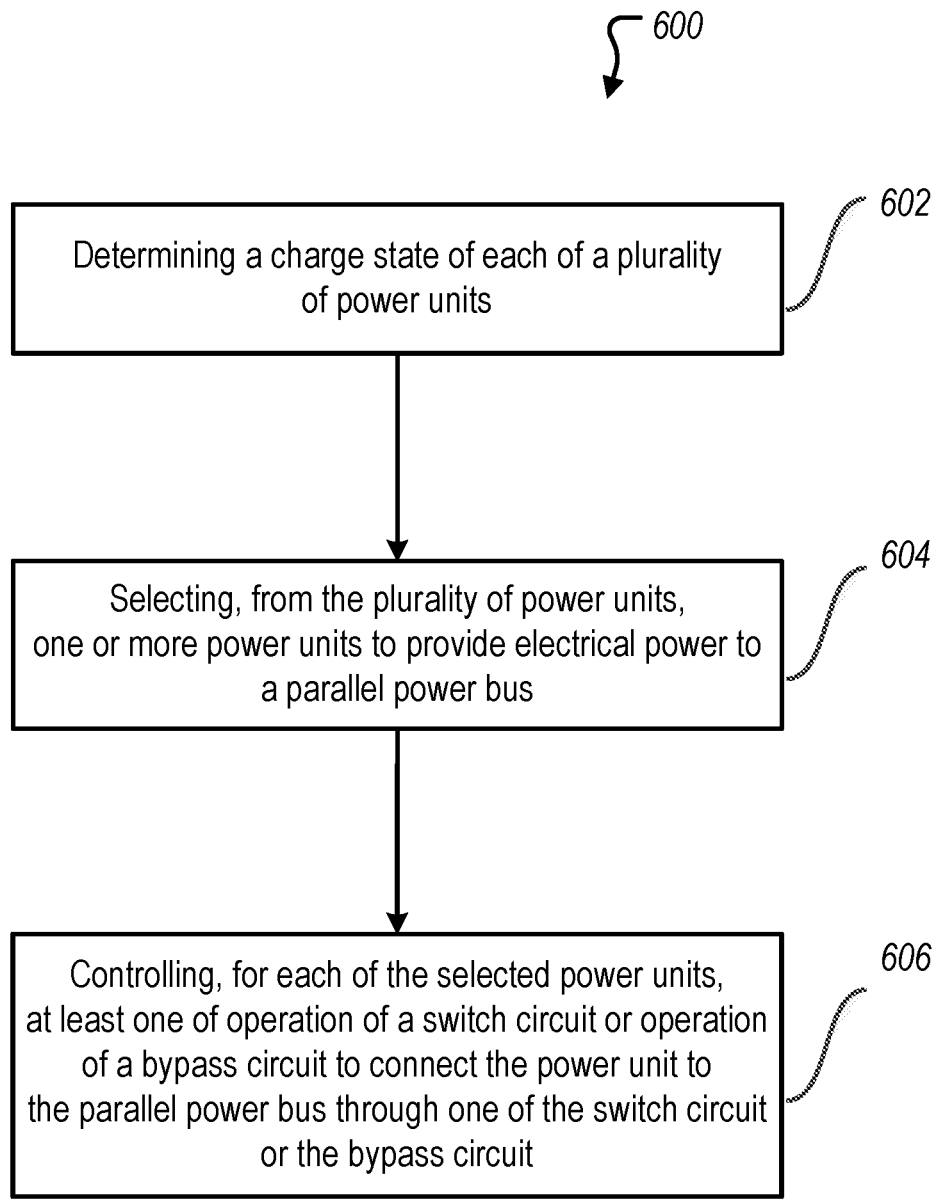
FIG. 6 is a flowchart describing a process for operating a parallel power distribution and charging system.

FIG. 6 is an example flowchart describing a possible process 600 for operating a parallel power distribution and charging system in which the power units deliver power to the bus. FIG. 6 is an example process 600 illustrated as being executed by systems such as the controllers 150, 150a, 150b, 150c. However, it will be understood that process 600 may be performed, for example, by any other suitable system, environment, software, and hardware, or a combination of systems, environments, software, and hardware as appropriate.

At 602, the process 600 includes determining a charge state of each of a plurality of power units. For example, referring to FIGS. 1 and 2A, the controller 150 can determine a charge state of each of the power units 102a-c. In some examples, the controller 150 can determine a charge state of a power unit based on a voltage of the power unit. The power units 102a-c are batteries, fuel cells, solar cells, and/or other types of power units.

At 604, the process 600 includes selecting, from the plurality of power units, one or more power units to provide electrical power to a parallel power bus. For example, from the power unit 102a-c, the controller 150 can select power units 102a and 102b to provide electric power to the parallel power bus 130. In some examples, the controller 150 can select the power units 102a and 102b based at least in part on the charge states of the power units 102a-c and the requirements of the system.

At 606, the process 600 includes controlling, for each of the selected power units, at least one of operation of a switch circuit or operation of a bypass circuit to connect the power unit to the parallel power bus through one of the switch circuit or the bypass circuit. For example, the controller 150 can control, for the power unit 102a, operation of the switch circuit to connect the power unit 102a to the power bus 130 through the switch circuit including the switch 104a. The switch 104a is a bidirectional switch, a unidirectional switch, a MOSFET switch, and/or another type of switch. The controller 150 can control, for the power unit 102b, operation of the bypass circuit including power converter 106b to connect the power unit 102b to the power bus 130 through the bypass circuit including the power converter 106b. The power converter 106b is a Boost converter, a Buck converter, a Buck-Boost converter, a dual active bridge converter, a resonant converter, and/or another type of power converter.

FIG. 7 depicts example systems that can be implemented with the disclosed systems and methods. Example systems can include, e.g., robotic machines 702, cars 704, trucks 706, mobility assistance devices such as wheelchairs 708, and marine vessels 710. In some examples, the system 100 can include an aerial vehicle 712 such as an unmanned drone. In some examples, the system 100 can be an electrical distribution system 714 such as a power line system. In some examples, the system 100 can be a recreational vehicle 716 such as a bicycle.

A number of implementations have been described. Nevertheless, it will be understood that various modifications may be made without departing from the spirit and scope of the disclosure. For example, various forms of the flows shown above may be used, with steps re-ordered, added, or removed.

Functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. An electrical power management module configured to provide electrical power from a power unit to a parallel power bus, comprising:
    a switch circuit coupleable to the power unit and to the parallel power bus for delivering power from the power unit to the parallel power bus and for charging the power unit from the parallel power bus, the switch circuit changeable between connecting and disconnecting the power unit with the parallel power bus; and
    a bypass circuit around the switch circuit, coupleable to the power unit and to the parallel power bus for delivering power from the power unit to the parallel power bus and for charging the power unit from the parallel power bus, the bypass circuit comprising a bidirectional power converter.

2. The electrical power management module of claim 1, further comprising:
    a controller configured to perform operations comprising:
        determining to connect the power unit to the parallel power bus; and in response to determining to connect the power unit to the parallel power bus, controlling at least one of operation of the switch circuit or operation of the bypass circuit to connect the power unit to the parallel power bus through one of the switch circuit or the bypass circuit.

3. The electrical power management module of claim 2, the operations further comprising:
    determining to connect the power unit to the parallel power bus to provide electrical power to the parallel power bus;
    determining a voltage difference between a voltage of the parallel power bus and a voltage of the power unit; and
    based on the voltage difference exceeding a specified threshold voltage difference, controlling operation of the bypass circuit to cause the power unit to provide electrical power to the parallel power bus through the bidirectional power converter.

4. The electrical power management module of claim 3, wherein controlling operation of the bypass circuit to cause the power unit to provide electrical power to the parallel power bus through the bidirectional power converter comprises:
    controlling operation of the bidirectional power converter to boost current flow from the power unit to the parallel power bus.

5. The electrical power management module of claim 2, the operations further comprising:
    determining to connect the power unit to the parallel power bus to charge the power unit from the parallel power bus;
    determining a voltage difference between a voltage of the parallel power bus and a voltage of the power unit; and
    based on the voltage difference exceeding a specified threshold voltage difference, controlling operation of the bypass circuit to cause the power unit to charge from the parallel power bus through the bidirectional power converter.

6. The electrical power management module of claim 5, wherein controlling operation of the bypass circuit to cause the power unit to receive electrical power from the parallel power bus through the bidirectional power converter comprises:
    controlling operation of the bidirectional power converter to control current flow from the parallel power bus to the power unit.

7. The electrical power management module of claim 2, the operations further comprising:
    determining to connect the power unit to the parallel power bus to provide electrical power to the parallel power bus;
    determining a voltage difference between a voltage of the parallel power bus and a voltage of the power unit; and
    based on the voltage difference being less than a specified threshold voltage difference, controlling operation of the switch circuit to cause the power unit to provide electrical power to the parallel power bus through the switch circuit.

8. The electrical power management module of claim 2, the operations further comprising:
    determining to connect the power unit to the parallel power bus to charge the power unit from the parallel power bus;
    determining a voltage difference between a voltage of the parallel power bus and a voltage of the power unit; and
    based on the voltage difference being less than a specified threshold voltage difference, controlling operation of the switch circuit to cause the power unit to charge from the parallel power bus through the switch circuit.

9. The electrical power management module of claim 1, wherein the bidirectional power converter is configured to operate as a step up converter in a first direction from the power unit to the parallel power bus and to operate as a step down converter in a second direction from the parallel power bus to the power unit.

10. The electrical power management module of claim 1, wherein the power unit is selected from the group consisting of: a lithium-ion battery, a lead battery, a fuel cell, or a solar cell.

11. The electrical power management module of claim 1, wherein the switch circuit includes a switch selected from the group consisting of: a unidirectional switch, a bidirectional switch, and a MOSFET.

12. The electrical power management module of claim 1, wherein the bidirectional power converter is selected from the group consisting of: a Buck-Boost converter, a dual-active bridge, and a resonant converter.

13. A system, comprising;
    a plurality of electrical power management modules arranged in parallel and each configured to connect and disconnect a respective power unit of a plurality of power units to a parallel power bus, each electrical power management module comprising:
        a switch circuit coupleable to the corresponding power unit and to the parallel power bus for delivering power from the corresponding power unit to the parallel power bus and for charging the corresponding power unit from the parallel power bus, the switch circuit changeable between connecting and disconnecting the corresponding power unit with the parallel power bus; and
        a bypass circuit around the switch circuit, coupleable to the corresponding power unit and the parallel power bus for delivering power from the corresponding power unit to the parallel power bus and for charging the corresponding power unit from the parallel power bus, the bypass circuit comprising a bidirectional power converter.

14. The system of claim 13, further comprising:
    a controller configured to perform operations comprising:
        selecting, from the plurality of power units, one or more power units to provide electrical power to the parallel power bus; and
        controlling, for each respective electrical power management module corresponding to the selected one or more power units, at least one of operation of the switch circuit or operation of the bypass circuit to connect the power unit to the parallel power bus through one of the switch circuit or the bypass circuit.

15. The system of claim 14, the operations further comprising:
    identifying a power unit of the plurality of power units that has a highest charge state;
    controlling the switch circuit of the electrical power management module corresponding to the identified power unit to connect the identified power unit to the parallel power bus through the switch circuit; and
    for each of the plurality of power units, excluding the identified power unit:
        controlling the bypass circuit of the corresponding electrical power management module to connect the power unit to the parallel power bus through the bypass circuit.

16. The system of claim 14, the operations further comprising, for each of the selected one or more power units:
   determining an electrical current to draw from the power unit to provide power to the parallel power bus; and
   controlling operations of the switch circuit or the bypass circuit to draw the determined electrical current from the power unit.

17. The system of claim 16, the operations further comprising determining the electrical current to draw from the power unit based at least in part on a charge state of the power unit.

18. The system of claim 13, further comprising:
   a controller configured to perform operations comprising:
      selecting, from the plurality of power units, one or more power units to charge from the parallel power bus; and
      controlling, for each respective electrical power management module corresponding to the selected one or more power units, at least one of the operation of the switch circuit or operation of the bypass circuit to connect the power unit to the parallel power bus through one of the switch circuit or the bypass circuit.

19. The system of claim 18, the operations further comprising selecting the one or more power units to receive electrical power from the parallel power bus based at least in part on a charge state of each of the plurality of power units.

20. The system of claim 13, wherein the parallel power bus is configured to provide electrical power to a drive motor of an electric vehicle.

21. A computer-implemented method for controlling operations of a plurality of electrical power management modules that are each configured to connect and disconnect a respective power unit of a plurality of power units to a parallel power bus, each electrical power management module comprising:
   a switch circuit coupleable to the corresponding power unit and to the parallel power bus for delivering power from the corresponding power unit to the parallel power bus and for charging the corresponding power unit from the parallel power bus, the switch circuit changeable between connecting and disconnecting the corresponding power unit with the parallel power bus; and
   a bypass circuit around the switch circuit, coupleable to the corresponding power unit and the parallel power bus for delivering power from the corresponding power unit to the parallel power bus and for charging the corresponding power unit from the parallel power bus, the bypass circuit comprising a bidirectional power converter,
wherein the method comprises:
   selecting, from the plurality of power units, one or more power units to connect to the parallel power bus; and
   controlling, for each respective electrical power management module corresponding to the selected one or more power units, at least one of operation of the switch circuit or operation of the bypass circuit to connect the power unit to the parallel power bus through one of the switch circuit or the bypass circuit.

* * * * *